United States Patent
Hamabe et al.

(10) Patent No.: US 10,024,167 B2
(45) Date of Patent: **\*Jul. 17, 2018**

(54) TURBINE BLADE

(71) Applicant: IHI Corporation, Tokyo (JP)

(72) Inventors: Masaaki Hamabe, Tokyo (JP); Ayumi Mamada, Tokyo (JP); Ruriko Yamawaki, Tokyo (JP); Hiroshi Hamazaki, Tokyo (JP); Akira Takahashi, Tokyo (JP)

(73) Assignee: IHI CORPORATION, Tokyo (JP)

( * ) Notice: Subject to any disclaimer, the term of this patent is extended or adjusted under 35 U.S.C. 154(b) by 588 days.

This patent is subject to a terminal disclaimer.

(21) Appl. No.: 14/700,517

(22) Filed: Apr. 30, 2015

(65) Prior Publication Data
US 2015/0233253 A1 Aug. 20, 2015

Related U.S. Application Data

(63) Continuation of application No. PCT/JP2013/077727, filed on Oct. 11, 2013.

(30) Foreign Application Priority Data

Oct. 31, 2012 (JP) .................................. 2012-240579

(51) Int. Cl.
*F01D 5/14* (2006.01)

(52) U.S. Cl.
CPC .............. *F01D 5/141* (2013.01); *F01D 5/147* (2013.01); *F05D 2220/30* (2013.01); *F05D 2250/71* (2013.01)

(58) Field of Classification Search
CPC . F01D 5/14; F01D 5/141; F01D 5/145; F01D 5/147; F05D 2250/14;
(Continued)

(56) References Cited

U.S. PATENT DOCUMENTS 1,504,710 A * 8/1924 Roberts .................. F03B 3/126
    416/237
3,820,918 A * 6/1974 Goldstein ............... F04D 21/00
    415/119

(Continued)

FOREIGN PATENT DOCUMENTS

CA      2833859 A1 * 11/2012 ............... F01D 5/14
DE      2524250 A1    2/1976
(Continued)

OTHER PUBLICATIONS

Extended European Search Report, European Patent Application No. 13851985.5, dated Jul. 27, 2016, 6 pgs.
(Continued)

Primary Examiner — Christopher Verdier
Assistant Examiner — Wayne A Lambert
(74) *Attorney, Agent, or Firm* — Volpe and Koenig, P.C.

(57) ABSTRACT

A turbine blade has a profile including a blade suction side line, a blade pressure side line, and a blade trailing edge positioned between the rear ends of the blade suction side and pressure sidelines. The blade trailing edge of the profile is formed by connecting a pressure side arc-like curve having a constant radius of curvature and extending from the rear end of the blade pressure side line toward the camber line of the profile, and a suction side line portion which extends from the rear end of the blade suction side line toward the camber line while passing through a region closer to the camber line than a symmetric curve portion which is line-symmetric to the pressure side arc-like curve with respect to the camber line. The suction side line portion is represented by curves constituting ellipses which constitute ellipses, and a straight line.

12 Claims, 4 Drawing Sheets

(58) Field of Classification Search
CPC ........... F05D 2250/71; F05D 2250/322; F05D 2250/70; F05D 2220/30; Y02T 50/671; Y02T 50/672
See application file for complete search history.

(56) References Cited

U.S. PATENT DOCUMENTS

| | | | |
|---|---|---|---|
| 1,080,102 A | | 3/1978 | Schwab |
| 4,080,102 A * | | 3/1978 | Schwab ................. F01D 5/141 416/223 A |
| 6,769,879 B1 * | | 8/2004 | Cleveland ............... F01D 5/141 416/223 A |
| 7,547,187 B2 * | | 6/2009 | Senoo .................... F01D 5/143 415/191 |
| 7,597,544 B2 * | | 10/2009 | Hasenjager ............. F01D 5/141 416/242 |
| 9,371,734 B2 * | | 6/2016 | Hamabe .................. F01D 5/14 |
| 2003/0170125 A1 | | 9/2003 | Olhofer et al. |
| 2009/0249623 A1 | | 10/2009 | Holze et al. |
| 2013/0004302 A1 * | | 1/2013 | Senoo .................... F01D 5/141 415/181 |
| 2013/0115075 A1 * | | 5/2013 | Gustafson ............... F01D 5/142 415/211.2 |

FOREIGN PATENT DOCUMENTS

| | | |
|---|---|---|
| DE | 10039642 A1 | 3/2002 |
| DE | 102004009696 B3 | 8/2005 |
| EP | 2106876 A1 | 10/2009 |
| GE | 2085976 A | 5/1982 |
| JP | 57-113906 A | 7/1982 |
| JP | 2003-254002 A | 9/2003 |
| JP | 2005-76533 A | 3/2005 |
| JP | 2011-17290 A | 1/2011 |
| WO | 2012/147938 A1 | 11/2012 |

OTHER PUBLICATIONS

International Search Report, PCT/JP2013/077727, dated Nov. 12, 2013, 2 pgs.

* cited by examiner

FIG. 3
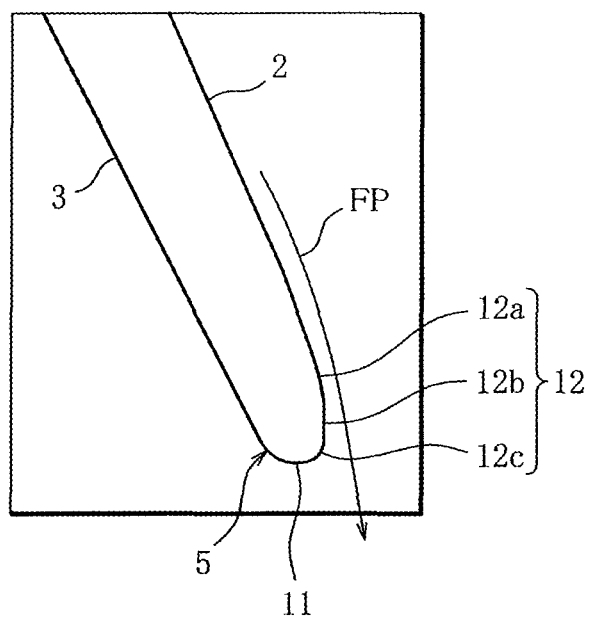
FIG. 4 -PRIOR ART
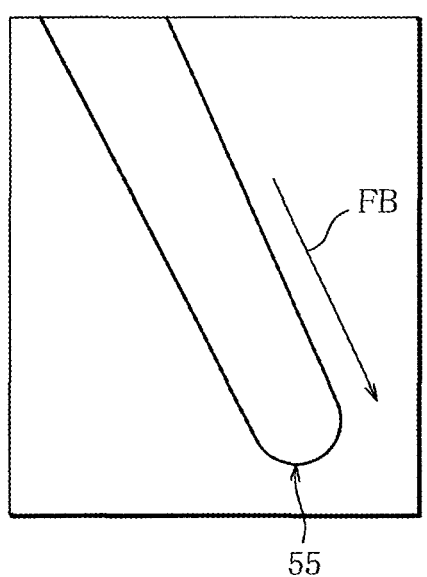

REDUCTION RATIO OF TOTAL PRESSURE LOSS COEFFICIENT ACCORDING TO TURBINE BLADE OF EMBODIMENT

TURBINE BLADE

TECHNICAL FIELD

The present invention relates to turbine blades used, for example, in jet engines for aircraft.

BACKGROUND ART

Attention has been directed to profile loss as a factor in improving the performance of turbine blades of the aforementioned type. The main cause of the profile loss is a loss caused by velocity distribution defects attributable to wake flows behind the blade trailing edges of the turbine blades. Thus, in order to reduce the profile loss, it is important to keep the velocity distribution defects as low as possible.

It has been known that a turbine blade whose blade trailing edge has a smaller thickness shows less velocity distribution defects. Many of turbine blades employ a blade trailing edge having a profile such that the blade suction side line and the blade pressure side line are connected by an arc corresponding to nearly the half of a true circle or by a straight line perpendicular to the camber line.

Where the turbine blade has such a profile that the blade trailing edge has a semicircular shape, the thickness of the blade trailing edge cannot be made smaller than the diameter of the semicircle. As a result, the blade trailing edge of the turbine blade becomes relatively large in thickness and produces significant wake flows, causing relatively large velocity distribution defects.

As conventional turbine blades configured to reduce the velocity distribution defects, the turbine blade disclosed in Patent Document 1 has been known, by way of example.

The trailing edge portion of the turbine blade disclosed in Patent Document 1 has such a curved surface that the radius of curvature gradually decreases from one of the blade suction side and pressure side lines toward the rear end located at the most downstream side as viewed in the fluid flowing direction, is the smallest at the rear end, and then gradually increases from the rear end toward the other of the blade suction side and pressure side lines up to the other of the blade suction side and pressure side lines.

PRIOR ART DOCUMENTS

Patent Documents

Patent Document 1: Unexamined Japanese Patent Publication No. 2011-017290

SUMMARY OF THE INVENTION

Problems to be Solved by the Invention

Compared with the turbine blade whose blade trailing edge has a semicircular shape, the turbine blade disclosed in Patent Document 1 permits the blade trailing edge to be reduced in thickness while ensuring satisfactory strength, but has an increased blade chord length. Thus, the increased blade chord length possibly leads to a correspondingly increased weight of the blade or exerts an undesirable influence on structural design as a result of change in axial clearance between the blades, and a solution to these problems has been sought.

The present invention was made in view of the problems associated with the conventional art, and an object thereof is to provide a turbine blade which ensures satisfactory strength without entailing increase in blade weight or undesirable influence on structural design and which is also capable of further improving performance and increasing work by suppressing loss attributable to velocity distribution defects.

Means for Solving the Problems

To achieve the object, the present invention provides a turbine blade with a profile including a blade suction side line, a blade pressure side line, and a blade trailing edge positioned between a rear end of the blade suction side line and a rear end of the blade pressure side line, wherein the blade trailing edge of the profile is formed by connecting a pressure side arc-like curve having a constant radius of curvature and extending from the rear end of the blade pressure side line toward a camber line of the profile, and a suction side line portion which extends from the rear end of the blade suction side line toward the camber line while passing through a region closer to the camber line than a symmetric curve portion which is line-symmetric to the pressure side arc-like curve with respect to the camber line, the suction side line portion being represented by a curve constituting an ellipse which constitutes an ellipse, and a straight line.

In the case of a turbine blade with a camber, the camber line, which is the center line of the blade profile, is curved but is almost straight at the blade trailing edge. Thus, also in the turbine blade of the present invention, the camber line at the blade trailing edge is treated as a straight line.

Preferably, the straight line of the suction side line portion is positioned between a curve constituting an ellipse toward the suction side line connected to the rear end of the blade suction side line and a curve constituting an ellipse toward the arc-like curve connected to the pressure side arc-like curve. In this case, the curve constituting an ellipse toward the suction side line and the curve constituting an ellipse toward the arc-like curve positioned on either side of the straight line may be curves constituting the same ellipse or curves constituting different ellipses.

Also, a connection point between the rear end of the blade suction side line and the suction side line portion is preferably located at a position spaced from a rearmost end of the blade trailing edge of the profile by a distance greater than or equal to the radius of curvature of the pressure side arc-like curve and is within a range of 10% or less of a chord length of the turbine blade.

Preferably, the connection point between the rear end of the blade suction side line and the suction side line portion is located at a position spaced from the rearmost end of the blade trailing edge of the profile by a distance greater than or equal to three times the radius of curvature of the pressure side arc-like curve and is within a range of 10% or less of a chord length of the turbine blade.

As illustrated in FIG. 2, a position (perigee) S that can be set as the connection point P between the rear end of the blade suction side line 2 and the curve constituting an ellipse 12a toward the suction side line of the suction side line portion 12 and is nearest to the rearmost end 5a of the blade trailing edge 5 is determined on the basis of the radius R of the pressure side arc-like curve 11. Provided that the turbine blade has a chord length C, the radius R of the circle is very often set to 0.5% to 2% of the blade chord length C.

On the other hand, a position (apogee) that can be set as the connection point P between the rear end of the blade suction side line 2 and the curve constituting an ellipse 12a toward the suction side line of the suction side line portion 12 and is farthest from the rearmost end 5a of the blade trailing edge 5 is determined so as to be spaced from the rearmost end 5a of the blade trailing edge 5 of the profile by a distance of 10% or less of the blade chord length, in order to reduce the thickness of the blade trailing edge 5 as well as change in natural frequency. FIG. 2 illustrates the case where the connection point P between the rear end of the blade suction side line 2 and the curve constituting an ellipse 12a toward the suction side line of the suction side line portion 12 is located at a position spaced from the rearmost end 5a of the blade trailing edge 5 by a distance of 5% of the blade chord length C.

Preferably, a connection point between the pressure side arc-like curve and the curve constituting an ellipse toward the arc-like curve in the suction side line portion is located so as to be within a range of 30° from the camber line to either one of suction side and pressure side of the camber line about the center of the pressure side arc-like curve lying on the camber line.

In this case, the connection point between the pressure side arc-like curve and the suction side line portion can be shifted to the suction or pressure side of the camber line, so that greater flexibility is ensured for the connection between both pressure and the suction side curves, facilitating manufacture.

In the turbine blade of the present invention, the suction side line portion forming the blade trailing edge extends from the rear end of the blade suction side line to the vicinity of the camber line while passing through the region closer to the camber line than the symmetric curve portion which is line-symmetric to the pressure side arc-like curve with respect to the camber line. Accordingly, the thickness of the blade from the blade leading edge through the blade trailing edge of the profile is maintained and only the blade trailing edge is reduced in thickness. As a result, it is possible to minimize loss attributable to velocity distribution defects and increase work done by the turbine blade, without lowering mechanical strength and without entailing increase in weight of the blade or undesirable influence on structural design.

Additionally, because the suction side line portion forming the blade trailing edge is configured to be represented by a curve constituting an ellipse which constitutes an ellipse, and a straight line, a primary flow (air flow) is accelerated along the suction side line portion, thus reducing a boundary layer, and in addition, the primary flow is bent from the suction side line portion toward the pressure side arc-like curve due to the Coanda effect, so that the exit flow angle of the primary flow from the blade trailing edge increases.

Effects of the Invention

With the turbine blade according to the present invention, remarkable effects can be obtained such as the effect of ensuring satisfactory strength without entailing increase in blade weight or undesirable influence on structural design, the effect of reducing loss attributable to velocity distribution defects to further improve performance, and the effect of increasing the exit flow angle of the primary flow from the blade trailing edge to thereby increase work done by the turbine blade.

BRIEF DESCRIPTION OF THE DRAWINGS

FIG. 3 is a diagram explaining the profile of the turbine blade of FIG. 1 and illustrating the manner of how a primary flow bends from the suction side line portion toward a pressure side arc-like curve due to the Coanda effect.

FIG. 4 is a diagram explaining a profile of a conventional turbine blade and illustrating the manner of how the primary flow travels along the suction side line portion.

MODE FOR CARRYING OUT THE INVENTION

The present invention will be described below with reference to the drawings.

Figure 1:
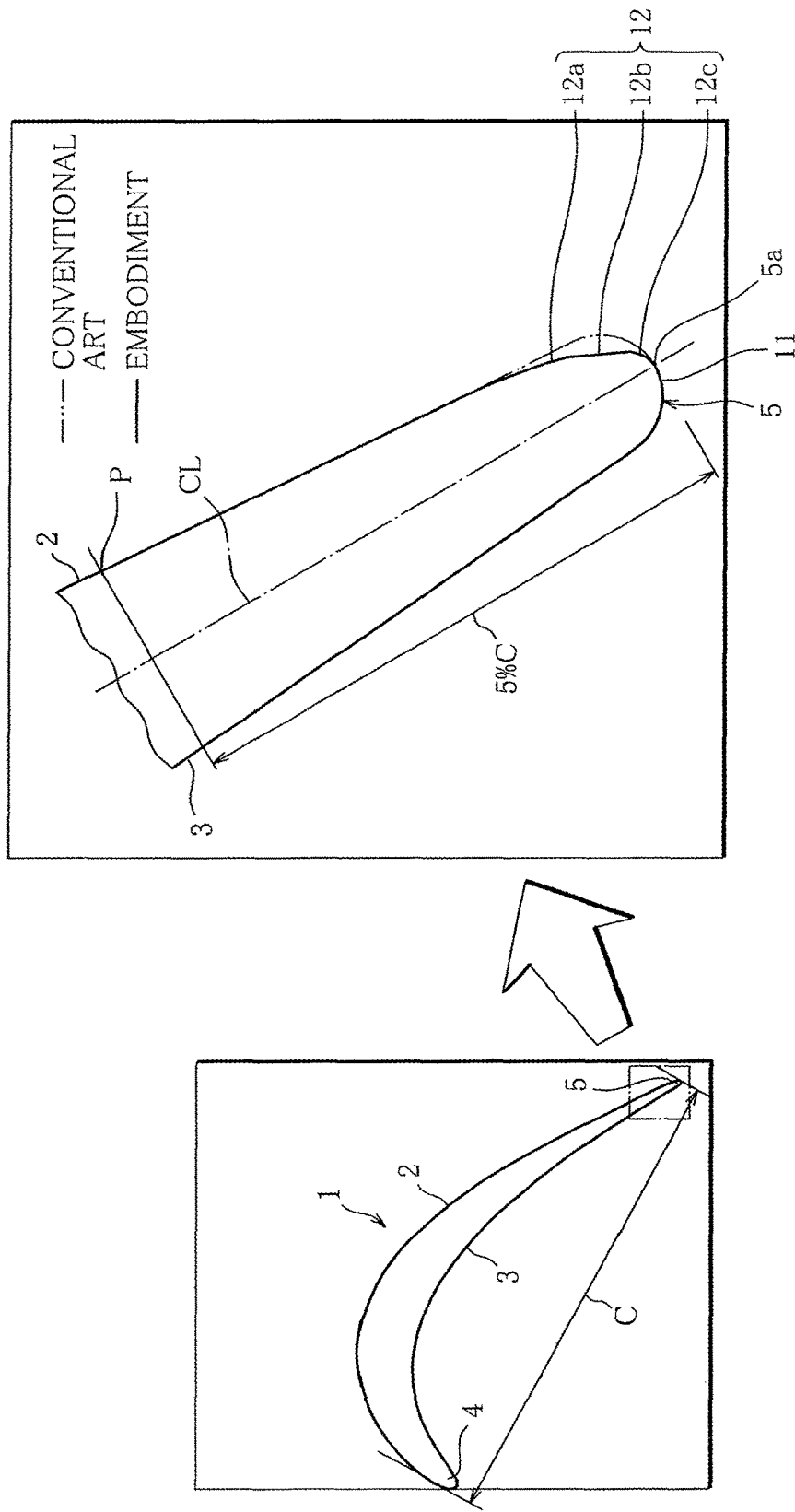
FIG. 1 is a diagram explaining a profile of a turbine blade according to one embodiment of the present invention.
Figure 2:
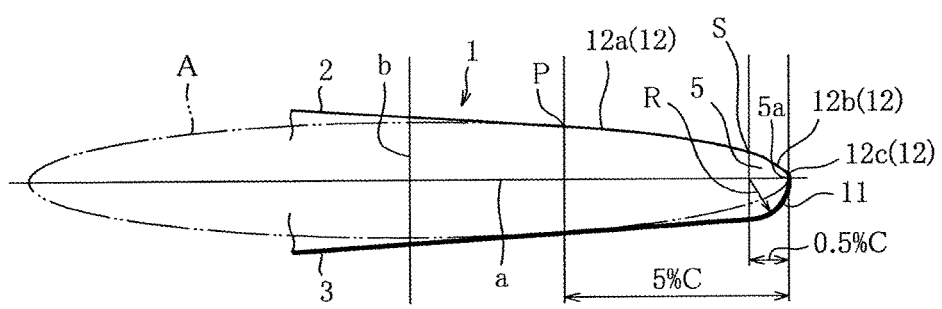
FIG. 2 is a diagram explaining the profile of the turbine blade of FIG. 1 and illustrating the manner of setting a connection point between the rear end of a blade suction side line and a suction side line portion of a blade trailing edge.

FIGS. 1 to 3 illustrate a profile of a turbine blade according to one embodiment of the present invention.

As illustrated in FIG. 1, the turbine blade 1 has a profile including a blade suction side line 2, a blade pressure side line 3, a blade leading edge 4, and a blade trailing edge 5. The blade trailing edge 5 is positioned between the rear end of the blade suction side line 2 and the rear end of the blade pressure side line 3, as shown in the part of FIG. 1 illustrating the profile on an enlarged scale.

The blade trailing edge 5 of the profile includes a pressure side arc-like curve 11 and a suction side line portion 12. The pressure side arc-like curve 11 has a constant radius of curvature extending from the rear end of the blade pressure side line 3 toward a camber line CL of the profile. The suction side line portion 12 extends from the rear end of the blade suction side line 2 toward the camber line CL while passing through a region closer to the camber line CL than a symmetric curve portion which is line-symmetric to the pressure side arc-like curve 11 with respect to the camber line CL (the symmetric curve portion is a curve portion indicated by the two-dot chain line in the enlarged part of FIG. 1, i.e., a conventional suction side line portion). The pressure side arc-like curve 11 and the suction side line portion 12 are connected to each other on the camber line CL.

As also illustrated in FIG. 2, the suction side line portion 12 is represented by a curve constituting an ellipse A and extending from the center of a curve portion along the major axis a of the ellipse A toward the center of a curve portion along the minor axis b of the ellipse A, that is, by curves constituting ellipses 12a and 12c, and a straight line 12b. The straight line 12b of the suction side line portion 12 is positioned between the curve constituting an ellipse 12a toward the suction side line which is connected to the rear end of the blade suction side line 2, and the curve constituting an ellipse 12c toward the arc-like curve which is connected to the pressure side arc-like curve 11 at the rearmost end 5a of the blade trailing edge 5.

In this case, a connection point P between the rear end of the blade suction side line 2 and the curve constituting an ellipse 12a toward the suction side line of the suction side line portion 12 is set at a position spaced from the rearmost end 5a of the blade trailing edge 5 of the profile by a distance of 5% C (C is the blade chord length), with a view to reducing the thickness of the blade trailing edge 5 and also suppressing change in natural frequency.

As stated above, in the turbine blade 1 of this embodiment, the suction side line portion 12 forming the blade trailing edge 5 extends from the rear end of the blade suction side line 2 and passes through the region closer to the camber line CL than the aforementioned symmetric curve portion. Accordingly, as illustrated in FIG. 3, a primary flow FP is accelerated along the suction side line portion 12 and is bent from the suction side line portion 12 toward the pressure side arc-like curve 11 due to the Coanda effect, so that the exit flow angle of the primary flow FP from the blade trailing edge 5 increases, compared with the conventional turbine blade of FIG. 4 in which a primary flow FB exits straight from a blade trailing edge 55.

That is, the thickness of the blade from the blade leading edge 4 through the blade trailing edge 5 of the profile is maintained and only the blade trailing edge 5 is reduced in thickness, compared with the blade trailing edge of the conventional turbine blade indicated by the two-dot chain line in the enlarged part of FIG. 1 (the conventional blade trailing edge is obtained by connecting the blade suction side line and the blade pressure side line by an arc corresponding to nearly the half of a true circle). It is therefore possible to suppress loss attributable to velocity distribution defects and to increase work done by the turbine blade 1, without lowering mechanical strength and without entailing increase in weight of the blade or undesirable influence on structural design.

With respect to each of the turbine blade 1 of the embodiment and the aforementioned conventional turbine blade, the reduction ratio of total pressure loss coefficient was measured for comparison, with the Reynolds number progressively increased such that the flow field gradually approached turbulent flow field. The measurement results obtained are shown in the graph of FIG. 5.

Figure 5:
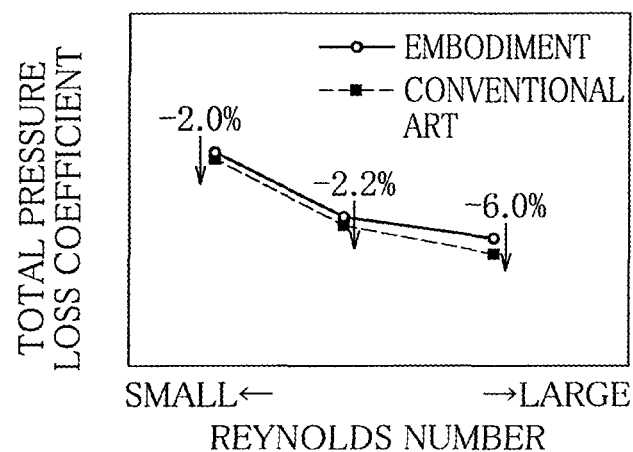
FIG. 5 is a graph showing a reduction ratio of total pressure loss coefficient according to the turbine blade of FIG. 1.

As illustrated in FIG. 5, where the Reynolds number is small, the turbine blade 1 of the embodiment and the conventional turbine blade show no substantial difference in the reduction ratio of the total pressure loss coefficient. Where the Reynolds number is large, however, the total pressure loss coefficient of the turbine blade 1 of the embodiment is lower by 6% than that of the conventional turbine blade. This demonstrates that the turbine blade 1 of the embodiment is capable of reducing loss caused by velocity distribution defects attributable to wake flows from the blade trailing edge 5.

Figure 6:
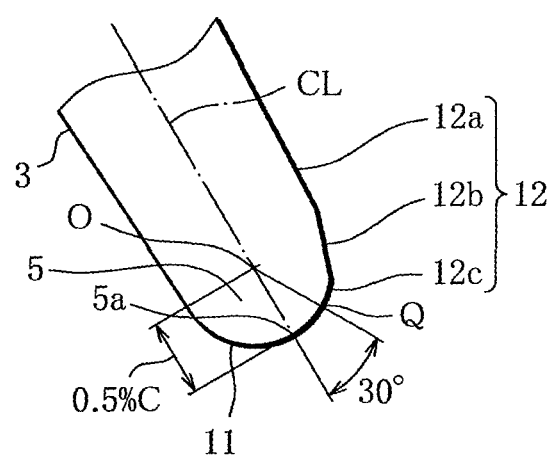
FIG. 6 is a diagram explaining a profile of a turbine blade according to another embodiment of the present invention and showing a rearmost end portion of the blade trailing edge on an enlarged scale.

In the embodiment of the present invention described above, the connection point between the pressure side arc-like curve 11 and the curve constituting an ellipse 12c toward the arc-like curve of the suction side line portion 12 forming the blade trailing edge 5 of the turbine blade 1 is located at the rearmost end 5a of the blade trailing edge 5 lying on the camber line CL. The position of the connection point is, however, not limited to the illustrated position, and as shown in FIG. 6, the connection point Q between the pressure side arc-like curve 11 and the curve constituting an ellipse 12c toward the arc-like curve of the suction side line portion 12 may be located so as to be within a range of 30° shifted to the suction side from the camber line CL about the center O of the pressure side arc-like curve 11 lying on the camber line CL.

Alternatively, the connection point Q between the pressure side arc-like curve 11 and the curve constituting an ellipse 12c toward the arc-like curve of the suction side line portion 12 may be located so as to be within a range of 30° shifted to the pressure side from the camber line CL about the center O of the pressure side arc-like curve 11.

In this manner, since the connection point Q between the pressure side arc-like curve 11 and the curve constituting an ellipse 12c toward the arc-like curve of the suction side line portion 12 can be shifted to either one of the suction side and pressure side of the camber line CL, greater flexibility is ensured for the connection between the pressure side arc-like curve 11 and the suction side line portion 12, facilitating manufacture.

Further, although the embodiment described above presents a case in which the curve constituting an ellipse 12a toward the suction side line and the curve constituting an ellipse 12c toward the arc-like curve positioned on either side of the straight line 12b of the suction side line portion 12 are curves constituting the same ellipse A, the present invention is not limited to this configuration and the curve constituting an ellipse 12a toward the suction side line and the curve constituting an ellipse 12c toward the arc-like curve may be curves constituting different ellipses.

The configuration of the turbine blade of the present invention is not limited to those explained above with reference to the embodiments.

EXPLANATION OF REFERENCE SIGNS

1: turbine blade
2: blade suction side line
3: blade pressure side line
5: blade trailing edge
5a: rearmost end of blade trailing edge
11: pressure side arc-like curve
12: suction side line portion
12a: curve constituting an ellipse toward the suction side line
12b: straight line
12c: curve constituting an ellipse toward the arc-like curve
A: ellipse
C: blade chord length
CL: camber line
O: center of pressure side arc-like curve
P: connection point between blade suction side line and suction side line portion
Q: connection point between pressure side arc-like curve and suction side line portion
R: radius of pressure side arc-like curve

The invention claimed is:

1. A turbine blade with a profile including a blade suction side line, a blade pressure side line, and a blade trailing edge positioned between a rear end of the blade suction side line and a rear end of the blade pressure side line,
    wherein the blade trailing edge of the profile is formed by connecting a pressure side arc-like curve having a constant radius of curvature and extending from the rear end of the blade pressure side line toward a camber line of the profile, and a suction side line portion which extends from the rear end of the blade suction side line toward the camber line while passing through a region closer to the camber line than a symmetric curve portion which is line-symmetric to the pressure side arc-like curve with respect to the camber line, the suction side line portion being represented by a curve constituting an ellipse, and a straight line.
2. The turbine blade according to claim 1, wherein the straight line of the suction side line portion is positioned between a curve constituting an ellipse toward a suction side line which is connected to a rear end of the blade suction side line, and a curve constituting an ellipse toward an arc-like curve which is connected to the pressure side arc-like curve.

3. The turbine blade according to claim 2, wherein a connection point between the rear end of the blade suction side line and the suction side line portion is located at a position spaced from a rearmost end of the blade trailing edge of the profile by a distance greater than or equal to a radius of curvature of the pressure side arc-like curve and is within a range of 10% or less of a chord length of the turbine blade.

4. The turbine blade according to claim 3, wherein a connection point between the pressure side arc-like curve and the suction side line portion is located so as to be within a range of 30° from the camber line to either one of the suction side and the pressure side of the camber line about the center of the pressure side arc-like curve lying on the camber line.

5. The turbine blade according to claim 2, wherein a connection point between the rear end of the blade suction side line and the suction side line portion is located at a position spaced from a rearmost end of the blade trailing edge of the profile by a distance greater than or equal to three times a radius of curvature of the pressure side arc-like curve and is within a range of 10% or less of a chord length of the turbine blade.

6. The turbine blade according to claim 5, wherein a connection point between the pressure side arc-like curve and the suction side line portion is located so as to be within a range of 30° from the camber line to either one of the suction side and the pressure side of the camber line about the center of the pressure side arc-like curve lying on the camber line.

7. The turbine blade according to claim 2, wherein a connection point between the pressure side arc-like curve and the suction side line portion is located so as to be within a range of 30° from the camber line to either one of the suction side and the pressure side of the camber line about the center of the pressure side arc-like curve lying on the camber line.

8. The turbine blade according to claim 1, wherein a connection point between the rear end of the blade suction side line and the suction side line portion is located at a position spaced from a rearmost end of the blade trailing edge of the profile by a distance greater than or equal to a radius of curvature of the pressure side arc-like curve and is within a range of 10% or less of a chord length of the turbine blade.

9. The turbine blade according to claim 8, wherein a connection point between the pressure side arc-like curve and the suction side line portion is located so as to be within a range of 30° from the camber line to either one of the suction side and the pressure side of the camber line about the center of the pressure side arc-like curve lying on the camber line.

10. The turbine blade according to claim 1, wherein a connection point between the rear end of the blade suction side line and the suction side line portion is located at a position spaced from a rearmost end of the blade trailing edge of the profile by a distance greater than or equal to three times a radius of curvature of the pressure side arc-like curve and is within a range of 10% or less of a chord length of the turbine blade.

11. The turbine blade according to claim 10, wherein a connection point between the pressure side arc-like curve and the suction side line portion is located so as to be within a range of 30° from the camber line to either one of the suction side and the pressure side of the camber line about the center of the pressure side arc-like curve lying on the camber line.

12. The turbine blade according to claim 1, wherein a connection point between the pressure side arc-like curve and the suction side line portion is located so as to be within a range of 30° from the camber line to either one of the suction side and the pressure side of the camber line about the center of the pressure side arc-like curve lying on the camber line.

* * * * *